(12) United States Patent
Randhawa et al.

(10) Patent No.: US 10,986,408 B1
(45) Date of Patent: Apr. 20, 2021

(54) SYSTEMS AND METHODS FOR RECOMMENDING LINEAR CONTENT

(71) Applicant: Verizon Patent and Licensing Inc., Arlington, VA (US)

(72) Inventors: Jaskirat Singh Randhawa, Brooklyn, NY (US); Abdul Mahmood, Union, NJ (US); Gary Sztajnman, Brooklyn, NY (US); Can Tatar, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/683,880

(22) Filed: Nov. 14, 2019

(51) Int. Cl.
| | |
|---|---|
| *H04N 21/466* | (2011.01) |
| *G06F 16/735* | (2019.01) |
| *G06F 16/738* | (2019.01) |
| *G06F 16/71* | (2019.01) |
| *H04N 21/482* | (2011.01) |
| *H04N 21/8549* | (2011.01) |
| *H04N 21/84* | (2011.01) |
| *G06N 3/08* | (2006.01) |

(52) U.S. Cl.
CPC ......... *H04N 21/4668* (2013.01); *G06F 16/71* (2019.01); *G06F 16/735* (2019.01); *G06F 16/738* (2019.01); *G06N 3/08* (2013.01); *H04N 21/4666* (2013.01); *H04N 21/4667* (2013.01); *H04N 21/4821* (2013.01); *H04N 21/84* (2013.01); *H04N 21/8549* (2013.01)

(58) Field of Classification Search
CPC ........... H04N 21/4668; H04N 21/4821; H04N 21/4666; H04N 21/4667; H04N 21/84; H04N 21/8549; G06F 16/738; G06F 16/71; G06F 16/735; G06N 3/08
See application file for complete search history.

(56) References Cited

U.S. PATENT DOCUMENTS

2009/0064229 A1* 3/2009 Morris ..................... G06F 3/00

\* cited by examiner

*Primary Examiner* — Anthony Bantamoi

(57) ABSTRACT

A device receives content data associated with a collection of content that is available to a user. The device determines, by processing the content data using a first data model that has been trained using machine learning, measures of likelihoods that the user will be receptive to each respective content of the collection of content. The device determines a duration during which the user is predicted to engage in a content watching session by using a second data model to process at least a portion of the content data. The device determines measures of utility that correspond to the collection of content and that measure utility that each respective content is predicted to have to the user during the content watching session. The device determines content recommendations for the user based on the measures of utility and causes at least one content recommendation to be displayed.

20 Claims, 12 Drawing Sheets

Example First
Set of Features

- Characteristics of particular content
- Trends found among users
  - Threshold quantity of users like particular content (e.g., of all users, of users of a certain demographic, and/or the like)

110
Identify first set of features to be used for training first data model

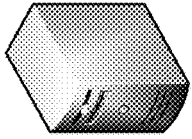

Content Recommendation Platform
102

112
Train first data model to predict content that a given user will be receptive to viewing

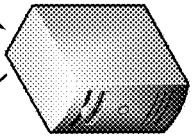

Content Recommendation Platform
102

FIG. 1B

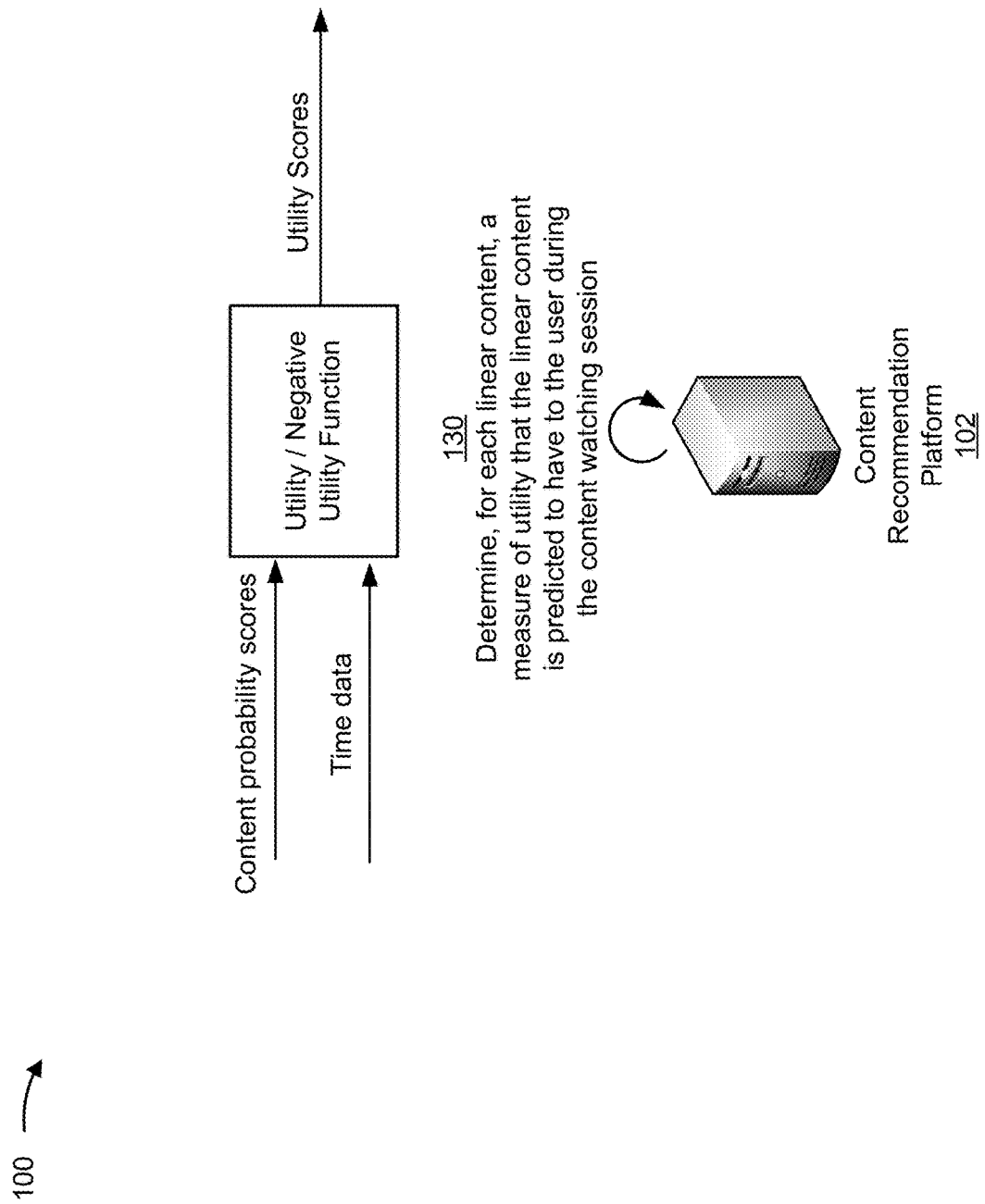

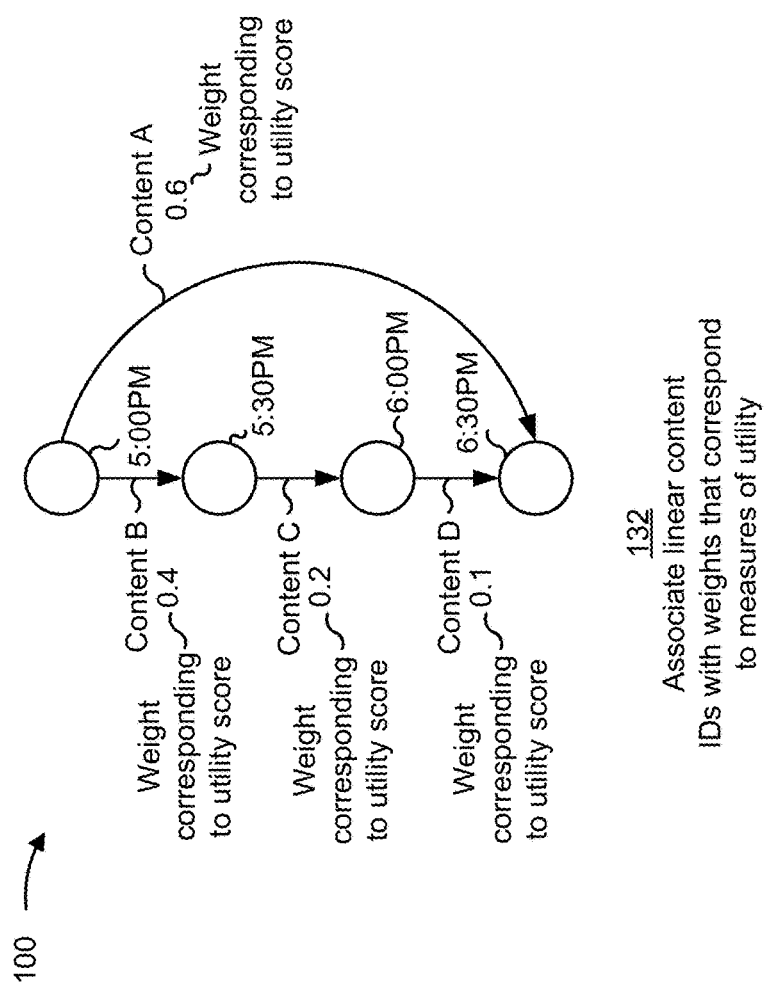
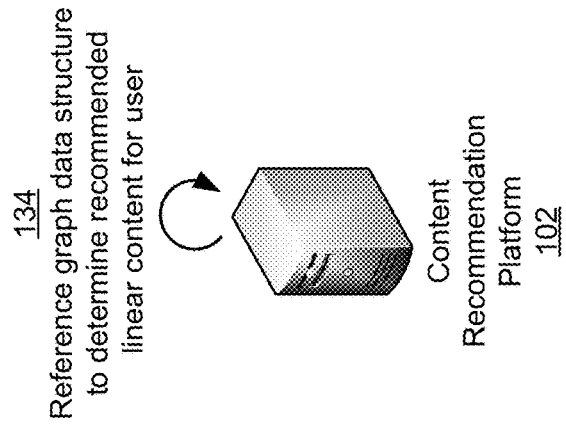
FIG. 1H

SYSTEMS AND METHODS FOR RECOMMENDING LINEAR CONTENT

BACKGROUND

Linear content may refer to content that is delivered at a scheduled time period. For example, an individual may turn on a TV (e.g., using a remote control) and may tune in to a channel that is broadcasting content during a scheduled time period. As another example, an individual may have a subscription to a streaming service that allows the individual to watch streamed content that is broadcast during a scheduled time period. Video on-demand (VOD) content (sometimes referred to as non-linear content) may refer to content that is available to users at any time period. For example, an individual may have a subscription to a streaming service and may stream recorded content at any time period via one or more laptop computers, mobile devices, and/or the like.

BRIEF DESCRIPTION OF THE DRAWINGS

FIGS. 1A-1I are diagrams of one or more example implementations described herein.

DETAILED DESCRIPTION OF PREFERRED EMBODIMENTS

Figure 1A:
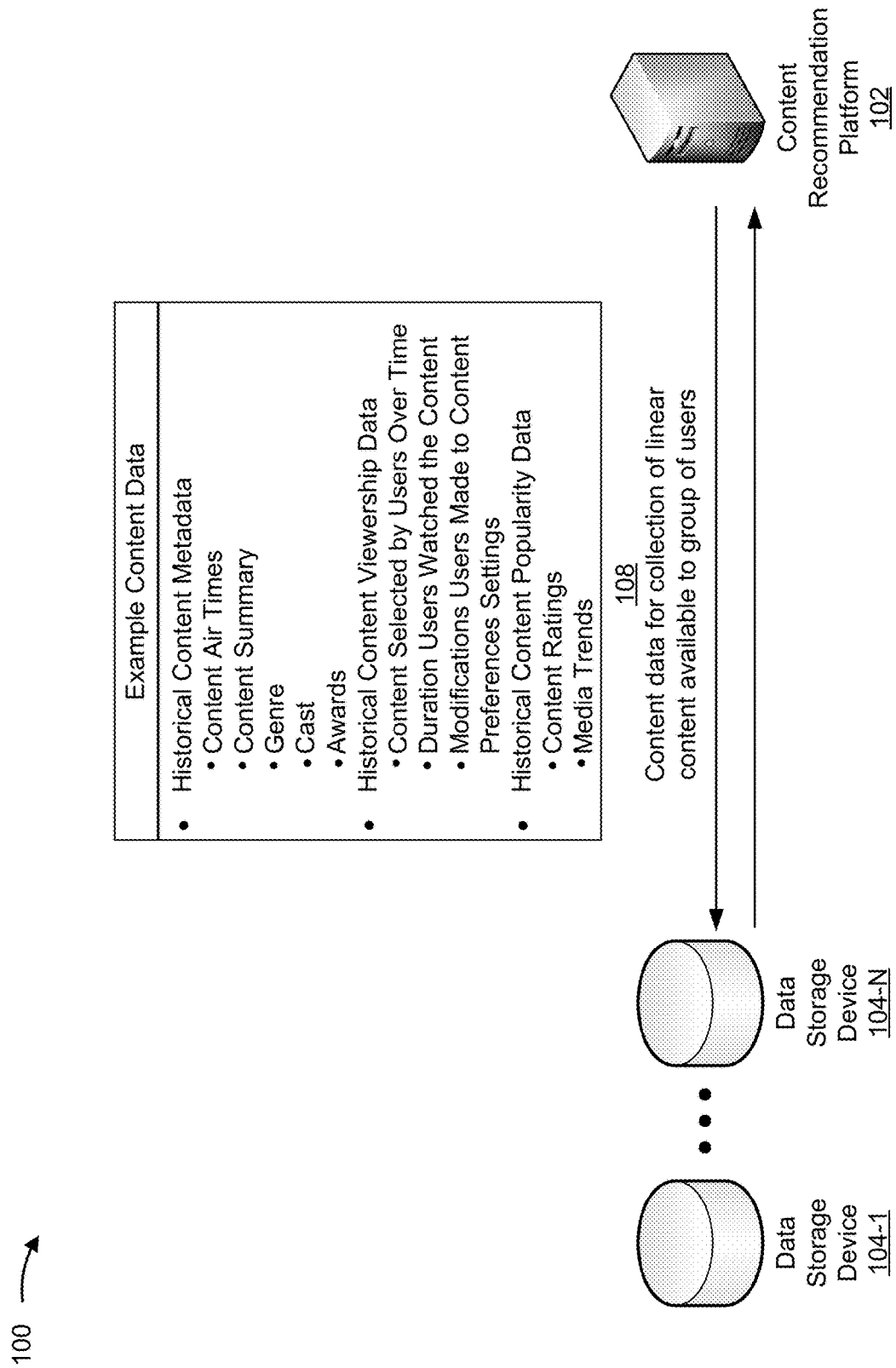

The following detailed description of example implementations refers to the accompanying drawings. The same reference numbers in different drawings may identify the same or similar elements.

VOD content (i.e., non-linear content) may refer to recorded content that is available to users at any time period. In some situations, VOD content delivery services can include a service to personalize non-linear content for a user. For example, a user may log into an account with a streaming service and may view a list of non-linear content that has been personalized based on preferences of the user.

Linear content may refer to content that is delivered at a scheduled time period, such as linear TV content, streamed content that is delivered at a scheduled time period, and/or the like. However, if a user subscribes to a linear content delivery service, the linear content that is presented to the user is limited to static, non-personalized content. Consequently, if the user is unable to identify any content of interest, the user may discontinue the linear service, may select sub-optimal linear content (e.g., a show that the user might not be interested in viewing), and/or the like. Furthermore, selecting sub-optimal linear content wastes device resources (e.g., processing resources, network resources, power resources, and/or the like) of the TV, a remote control, and/or related devices by scrolling through an electronic program guide (EPG) to identify and select linear content that the user is not interested in viewing.

According to some implementations described herein, a content recommendation platform may use machine learning to generate and provide a user with a personalized EPG that includes a set of recommended linear content. For example, the user may turn on a display which may trigger the content recommendation platform to recommend linear content to the user. In this case, the content recommendation platform may use machine learning to determine, for each respective linear content of a collection of linear content that is available to the user, a likelihood that the user will be receptive to the respective linear content.

Additionally, the content recommendation platform may use machine learning to predict a duration during which the user is likely to engage in a content watching session. Furthermore, the content recommendation platform may determine, for each respective linear content, a measure of utility that the respective linear content is predicted to have to the user during the content watching session, where the measure of utility may be based on a likelihood that the user will be receptive to the respective linear content and based on the duration during which the user is predicted to engage in the content watching session. In this case, the content recommendation platform may determine, based on each measure of utility, a set of recommended linear content for the user. Moreover, the content recommendation platform may cause the set of recommended linear content to be presented via the display (e.g., as part of the EPG).

In this way, the content recommendation platform efficiently and/or effectively provides the user with recommended linear content. For example, by using machine learning to recommend linear content, the content recommendation platform improves resource usage of the TV and/or related devices relative to resource usage in scenarios where the user has to manually search through the EPG to identify and select linear content. To provide a specific example, by recommending linear content that aligns with interests of the user, network traffic between the display and content delivery servers are reduced by eliminating situations where resources are wasted while the user is frequently changing channels on the TV. Additionally, power resources of the TV and a corresponding remote control are conserved by eliminating (or reducing) situations where the user is frequently changing channels on the TV. Furthermore, by ensuring that the recommended linear content is tailored to interests of the user, the content recommendation platform improves user satisfaction with the linear service, conserves resources that might otherwise be used to discontinue the service (e.g., were the user to be unhappy with the service), and/or the like.

FIGS. 1A-1I are diagrams of one or more example implementations 100 described herein. Example implementation(s) 100 may include a content recommendation platform 102, a group of data storage devices 104 (shown as data storage device 104-1 through data storage device 104-N), and display 106. As shown in FIGS. 1A-1I, content recommendation platform 102 may use machine learning to generate and provide a user with a personalized electronic program guide (EPG) that includes a set of recommended linear content. While one or more implementations are described in connection with recommending linear content, it is to be understood that this is provided by way of example. In practice, one or more implementations described herein may be applicable to over the top (OTT) media content and/or other types of content.

As shown in FIG. 1A, and by reference number 108, content recommendation platform 102 may obtain content data associated with a collection of linear content that is available to (or had been available to) a group of users. For example, content recommendation platform 102 may obtain, from the group of data storage devices 104, content data that may be used to train a first data model to recommend personalized linear content to users, as will be described further herein.

Linear content may include linear TV content that is broadcast at a scheduled time period, streamed content that is broadcast at a scheduled time period, and/or the like. For example, the linear content may include a TV show, a movie, a documentary, a sports game, and/or any other scheduled broadcast that may be made available to users via an EPG and/or a similar application or interface. The content data may include content metadata, content viewership data, content configuration data, content popularity data, and/or the like. The content metadata may include metadata that identifies air times of particular linear content, metadata that identifies a summary of particular content, metadata that identifies a genre of particular linear content, metadata that identifies a cast of particular linear content, metadata that identifies one or more awards associated with particular linear content, and/or the like.

The content viewership data may identify a set of interactions that the group of users have had with the collection of linear content over time. For example, the content viewership data may include a set of content logs that include content identifiers that identify specific content that users viewed over time, time data that identify durations during which the users viewed the content, and/or the like. The content configuration data may include parental guidance restrictions data, promotions data, user preferences data that identify one or more content viewing preferences associated with viewing linear content, and/or the like.

The content popularity data may identify one or more metrics that quantify a level of popularity of particular linear content. For example, the content popularity data may include ratings data that identify a set of content ratings made by users, trends data that identify one or more trends associated with users watching particular content, and/or the like. To provide a few specific examples, linear content may be trending based on a threshold number of users viewing the linear content, may be trending based on having a threshold quantity of advertising being published about the linear content, may be trending over one or more other mediums (e.g., a particular social media platform, a search engine tool, and/or the like), and/or the like.

In some implementations, content recommendation platform 102 may obtain the content data from the group of data storage devices 104. For example, content recommendation platform 102 may obtain the content data by submitting a content request via one or more communication interfaces. The one or more communication interfaces may include one or more application programming interfaces (APIs), one or more radio interfaces, and/or one or more other types of interfaces. In some implementations, content recommendation platform 102 may obtain content data that includes millions of data points, billions of data points, or more, such that the obtained content data cannot be processed manually or objectively by a human actor.

In some implementations, content recommendation platform 102 may perform one or more pre-processing operations on the content data. For example, content recommendation platform may obtain content data in different file types and/or file formats and may standardize the content data by converting the content data to a uniform file type and/or file format.

Additionally, or alternatively, content recommendation platform 102 may obtain supplemental data that may be used to train the first data model. For example, content recommendation platform 102 may obtain, from one or more other data storage devices 104, mobile application preferences and activity data, web browser search history data, and/or the like. The mobile application preferences and activity data may identify one or more preferences of the user when accessing a service via a mobile device. The web browser search history data may identify a search history for the user based on one or more past websites that the user has visited. The user purchasing history data may identify one or more previous purchasing transactions that the user has engaged in. In some implementations, users may have to opt-in to consent to allowing supplemental data to be generated, to consent to allow content recommendation platform 102 to obtain and analyze the supplemental data, and/or the like.

In this way, content recommendation platform 102 obtains content data for a collection of linear content that is (or had been) available to a group of users.

As shown in FIG. 1B, and by reference number 110, content recommendation platform 102 may identify a first set of features that are to be used to train the first data model. For example, content recommendation platform 102 may process the content data by using a set of feature identification techniques to identify a first set of features that impact likelihoods of users being receptive to particular linear content.

A user may be receptive to linear content if the user would enjoy watching the linear content (e.g., in general, relative to other linear content that may be available, and/or the like), if a threshold quantity of interests of the user match with characteristics of the linear content, and/or the like. The first set of features may include specific content data values (e.g., a content metadata value, a content viewership data value, and/or the like), one or more metrics associated with the content data (e.g., a metric that identifies a trend between multiple values, a metric that identifies an average of multiple values, a sum of multiple content data values, and/or the like), and/or the like. To provide a few specific examples, a feature may be a content data value that identifies a characteristic of particular linear content (e.g., a duration of the content, a genre of the content, an actor or actress involved in the content, and/or the like), a content data value that identifies a user interaction with particular linear content (e.g., an action to modify a sound volume of a TV and/or a related TV setting, an action to change displayed linear content to new linear content, and/or the like), a metric that identifies a trend indicating that a threshold quantity of users like (or dislike) particular linear content, and/or the like.

In some implementations, content recommendation platform 102 may determine the first set of features using the set of feature identification techniques. For example, content recommendation platform 102 may determine the first set of features by processing the content data using a technique that involves text mining and latent semantic analysis (LSA), a trend variable analysis technique, an interest diversity analysis technique, a technique using a neural network, a composite indicators analysis technique, a clustering technique, a regression technique, and/or the like.

As shown by reference number 112, content recommendation platform 102 may train the first data model to predict content that a given user will be receptive to viewing. For example, content recommendation platform 102 may train the first data model using the first set of features and/or one or more machine learning techniques, such as a collaborative filtering technique, a regression technique, a clustering technique, a technique associated with a neural network, and/or the like.

In some implementations, content recommendation platform 102 may train a neural network to predict content that a given user will be receptive to viewing. For example, content recommendation platform 102 may train a neural network that has an input layer, one or more hidden layers (e.g., a recurrent layer, a long short-term memory (LSTM) layer, a fully connected layer, a convolutional layer, a pooling layer, and/or the like), and an output layer. The neural network may be a recurrent neural network, an LSTM network, a tensor flow deep neural network, and/or the like. The first set of features may be hyperparameters that are used as part of a cost function of the neural network.

Additionally, content recommendation platform 102 may perform a feedforward technique and/or a similar type of technique to provide particular features (e.g., that are part of a test dataset) as input to the neural network, and the neural network may output a set of values that serve as measures of likelihoods of each linear content, of the collection of linear content, being receptive to a given user. In this case, content recommendation platform 102 may use a collaborative filtering technique and/or one or more other machine learning techniques to process the input and to identify and weight correlations between data points (e.g., particular content data values) included in the test dataset. Furthermore, content recommendation platform 102 may compare the values to known values and may determine an error value based on the comparison. The error value may be used to update the cost function (e.g., which may assign weights to particular features of the first set of features), and content recommendation platform 102 may iteratively train the neural network (e.g., using a backpropagation technique, a backpropagation through time technique, and/or the like) until a threshold level of accuracy has been reached.

Additionally, or alternatively, content recommendation platform 102 may train one or more other data models. For example, content recommendation platform 102 may train one or more other data models to assist the first data model in predicting linear content that users will be receptive to watching. As a specific example, content recommendation platform 102 may train another data model by using one or more computer vision and/or machine learning techniques to process video data that captures the linear content that is available to the group of users via the EPG. By processing the video data, content recommendation platform 102 may identify content attributes found within particular linear content and may train the other data model (and/or the first data model) to predict whether a given user will be receptive to the particular linear content based on a degree to which the identified content attributes align with interests of the user.

As another example, content recommendation platform 102 may train another data model by using one or more natural language processing techniques and/or machine learning techniques to process text data associated with interactions that users have had with a chatbot (e.g., a chatbot capable of being used to select particular linear content via the EPG and/or to provide explicit, measurable feedback on linear content). By processing the text data, content recommendation platform 102 may identify preferences that users have regarding particular linear content and may train the other data model (and/or the first data model) to predict whether a given user will be receptive to the particular linear content based on a degree to which the particular linear content aligns with the identified preferences of the users.

In this way, content recommendation platform 102 trains the first data model (and/or one or more other data models) to predict a likelihood that a given user will be receptive to viewing particular linear content.

Figure 1C:
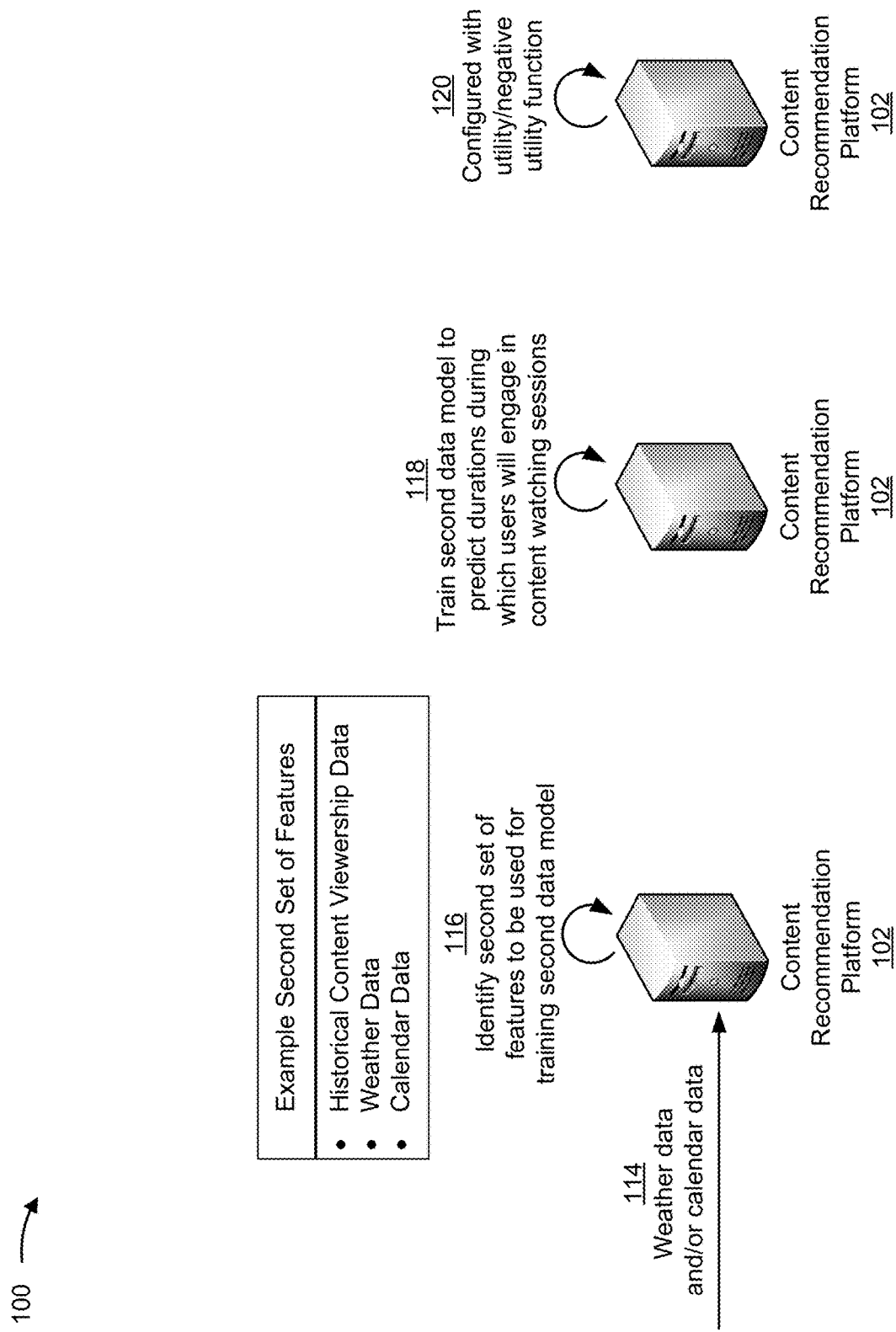

As shown in FIG. 1C, and by reference number 114, content recommendation platform 102 may receive weather data and/or calendar data. For example, content recommendation platform 102 may receive, from particular data storage devices 104 of the group of data storage devices 104, weather data and/or calendar data that is to be used to train a second data model.

The weather data may identify weather forecasts for areas associated with the group of users. The calendar data may identify events associated with the group of users, such as a holiday, a user-specific event that is scheduled into an electronic calendar of a user (e.g., a work event, a family outing, and/or the like), and/or the like. The weather data may be used to predict a duration during which a user will watch linear content because inclement weather may impact a likelihood of the user beginning to watch linear content, a likelihood of the user continuing to watch linear content, and/or the like. The calendar data may be used to predict a duration during which a user will watch linear content because a user having a scheduled event (e.g., as indicated in an electronic calendar) might impact a likelihood of the user beginning to watch linear content, a likelihood of the user continuing to watch linear content, and/or the like.

As shown by reference number 116, content recommendation platform 102 may identify a second set of features that may be used to train the second data model. For example, to predict not just a likelihood of a given user being receptive to particular linear content, but to predict linear content that the user will select and watch during a content watching session (e.g., a period during which the user watches linear content), content recommendation platform 102 may predict how long the user will spending watching content each time the user begins watching linear content. As a specific example, if the user is predicted to watch linear content for thirty minutes, a two-hour movie may be a poor recommendation, even if the user is receptive to viewing the movie. Consequently, content recommendation platform 102 may identify a second set of features that are capable of impacting whether a given user watches linear content, capable of impacting a duration during which a given user watches linear content during a content watching session, and/or the like. The second set of features may be identified using one or more feature identification techniques of the set of feature identification techniques described above.

The second set of features may include specific content viewership data values, specific weather data values, specific calendar data values, one or more metrics associated with the content viewership data values, the weather data values, and/or the calendar data values, and/or the like. For example, the specific content viewership data values may include a value indicating a time that a user began watching linear content during a content watching session, a value indicating a time that the user stopped watching linear content during the content watching session, and/or the like. As another example, the specific weather data values may include a value indicating a temperature at a particular geographic location for a given time period, a value indicating a chance of inclement weather at a particular geographic location for a given time period, and/or the like. As another example, the specific calendar data values may include a value indicating a date associated with a holiday, a value indicating a date associated with a user-specific event, and/or the like.

As shown by reference number 118, content recommendation platform 102 may train the second data model to predict durations during which users will engage in content watching sessions. For example, content recommendation platform 102 may train the second data model using the second set of features and/or a regression-based machine learning technique (and/or one or more of the other machine learning techniques described above).

In some implementations, content recommendation platform 102 may train a regression model to predict durations during which users will engage in content watching sessions. For example, content recommendation platform 102 may train a random forest regression model and/or another type of regression model by using a random forest classifier technique to construct multiple decision trees during training and may output a classification of data. Additionally, or alternatively, content recommendation platform 102 may train the second data model using one or more other types of machine learning techniques, models and/or classifiers. For example, content recommendation platform 102 may train the second data model using a gradient boosting technique, a logistic regression technique, a binary classification technique, an xgboost classifier, a naïve Bayes classifier, a support vector machine (SVM) classifier, and/or the like.

In some implementations, content recommendation platform 102 may receive a trained first data model and/or a trained second data model from another device. For example, the first data model and/or the second data model may be trained on another device and may be provided to and/or made available to content recommendation platform 102.

As shown by reference number 120, content recommendation platform 102 may be configured with a utility/negative utility function. For example, content recommendation platform 102 may be configured with a utility/negative utility function that is capable of measuring utility (and/or negative utility) that particular linear content is predicted to have to a given user during a content watching session. An output from the first data model and/or the second data model may be provided to the utility/negative utility function as an input and may cause the utility/negative utility function to output, for each linear content that is available to a given user, a measure of utility that the linear content is predicted to have to the user. A description of how the utility/negative utility function processes the output from the first data model and/or the second data model is provided below.

In some implementations, the second data model and/or the utility/negative utility function may be part of the first data model. For example, if the first data model is a neural network, the second data model may be a hidden layer in the neural network, the utility/negative utility function may be a hidden layer in the neural network, and/or the like.

In this way, content recommendation platform 102 trains the second data model and/or is configured with the utility/negative function.

Figure 1D:
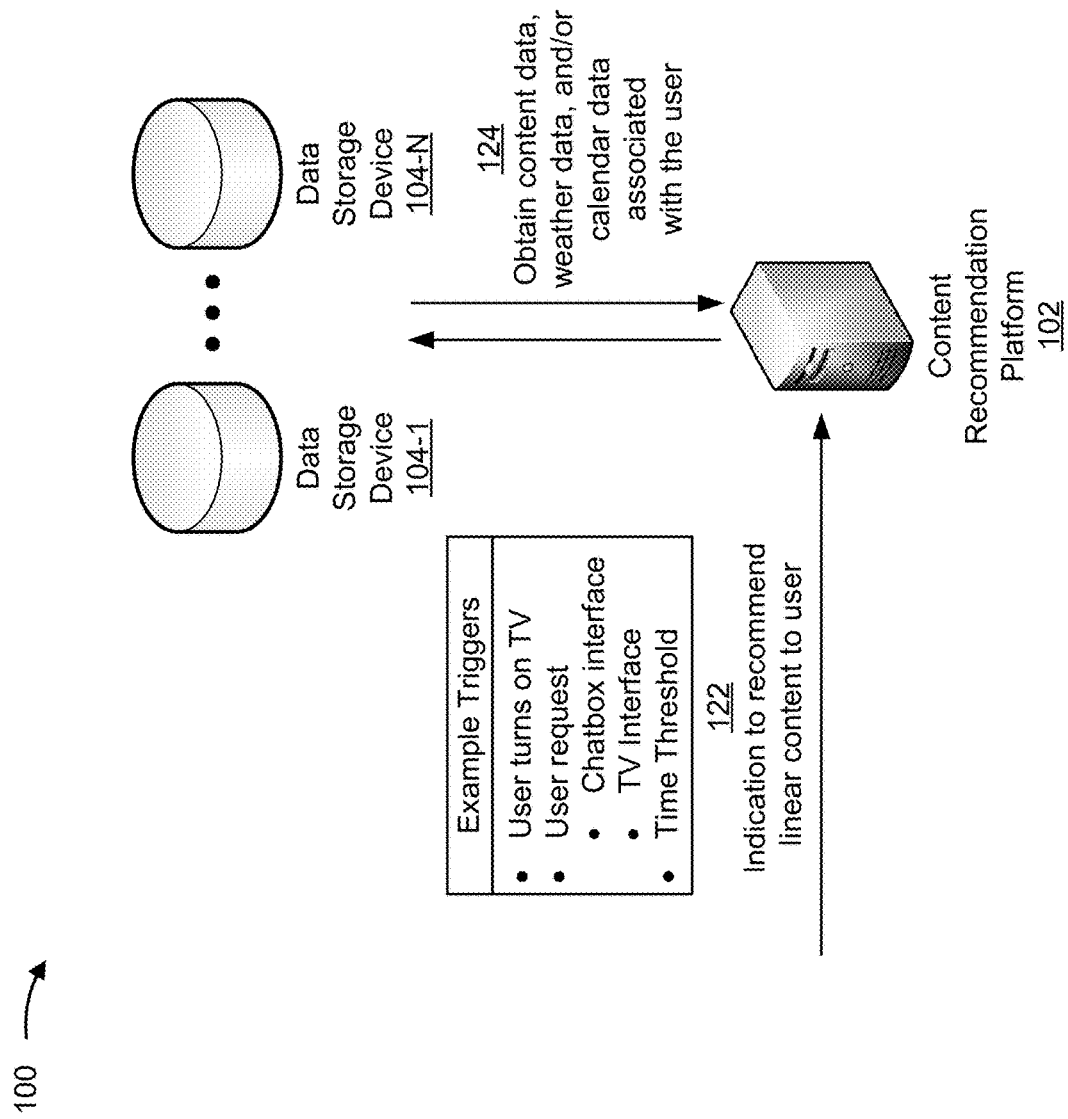

As shown in FIG. 1D, and by reference number 122, content recommendation platform 102 may receive an indication to recommend linear content to a user. For example, a TV of the user and/or a server that supports an EPG for the user may be configured to provide content recommendation platform 102 with a message indicating to recommend linear content to the user. The message may be provided to content recommendation platform 102 based on the user turning on the TV (e.g., which may launch the EPG), based on the user submitting a request for recommended linear content (e.g., by interacting with an interface of the EPG that allows the user to submit the request), and/or the like. In some implementations, content recommendation platform 102 may be configured to automatically recommend linear content to the user based on a time configuration (e.g., which may cause content recommendation platform 102 to recommend linear content periodically over time) and/or based on another type of trigger.

As shown by reference number 124, content recommendation platform 102 may obtain content data, weather data and/or calendar data associated with the user. For example, content recommendation platform 102 may obtain, from the group of data storage devices 104, content data for the user, weather data associated with a geographic location of the user, calendar data associated with the user, and/or the like. The content data may include one or more types of content data described above. The weather data may identify a weather forecast (e.g., a real-time forecast, a recently reported forecast, and/or the like) for a geographic location associated with the user, such as a location associated with an address listed in a user profile of the user, a location of a mobile device of the user, and/or the like. The calendar data may identify one or more holidays that are applicable to the user, one or more user-specified events associated with the user, and/or the like.

In this way, content recommendation platform 102 obtains content data, weather data, and/or calendar data that may be processed to recommend linear content to the user.

Figure 1E:
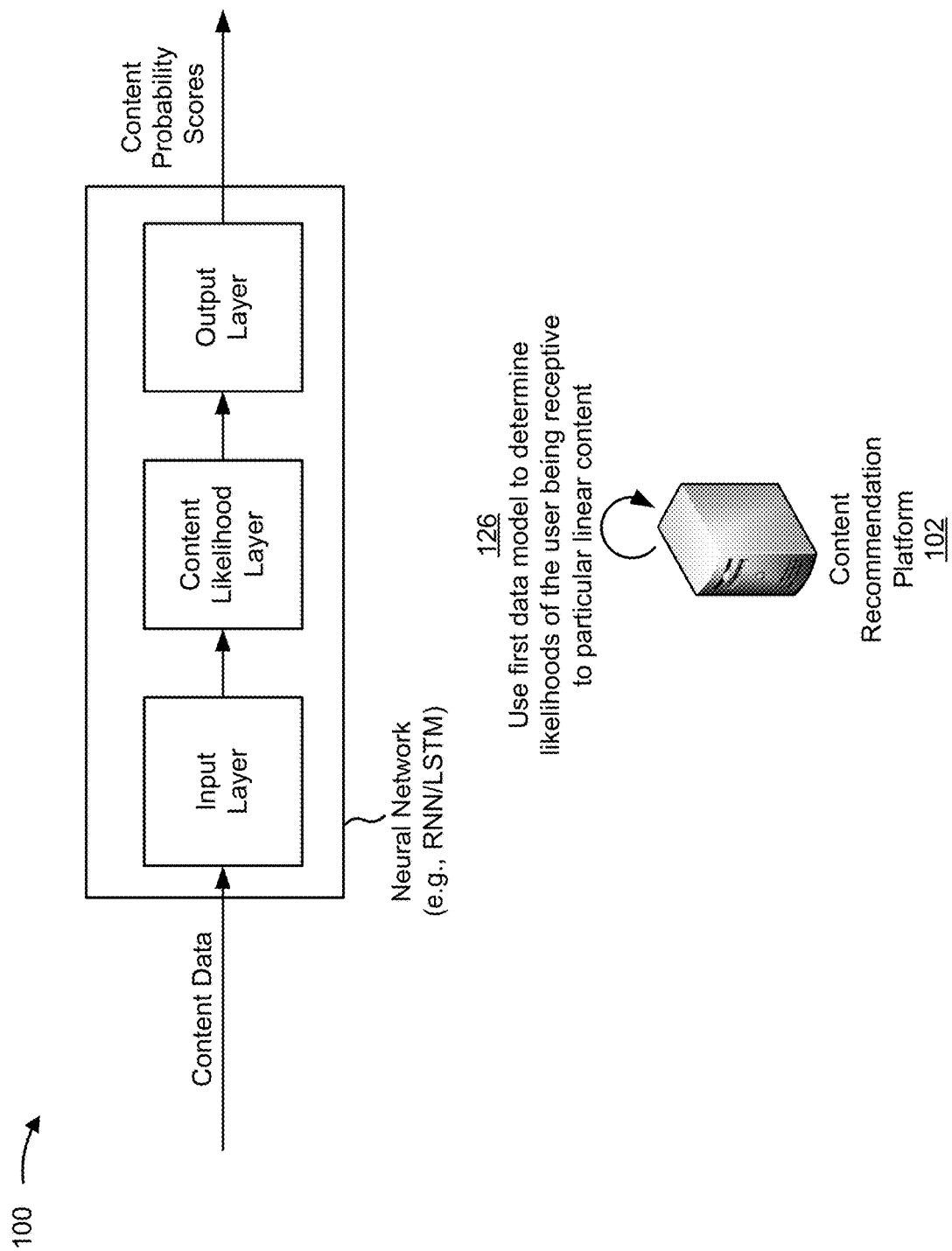

As shown in FIG. 1E, and by reference number 126, content recommendation platform 102 may use the first data model to determine likelihoods of the user being receptive to particular linear content. For example, content recommendation platform 102 may use the first data model to determine a set of measures of likelihoods of the user being receptive to each respective linear content of the collection of linear content. In this case, content recommendation platform 102 may provide the content data as input to the first data model to cause the first data model to output the set of measures of likelihoods (shown as content probability scores) of the user being receptive to each respective linear content.

To provide a specific example, assume there are 500 different TV programs showing over a 24-hour time period. In this example, content recommendation platform 102 may use the first data model to generate 500 content probability scores that measure likelihoods of the user being receptive to each of the 500 different TV programs.

In this way, content recommendation platform 102 determines likelihoods of the user being receptive to each linear content included in the collection of linear content.

Figure 1F:
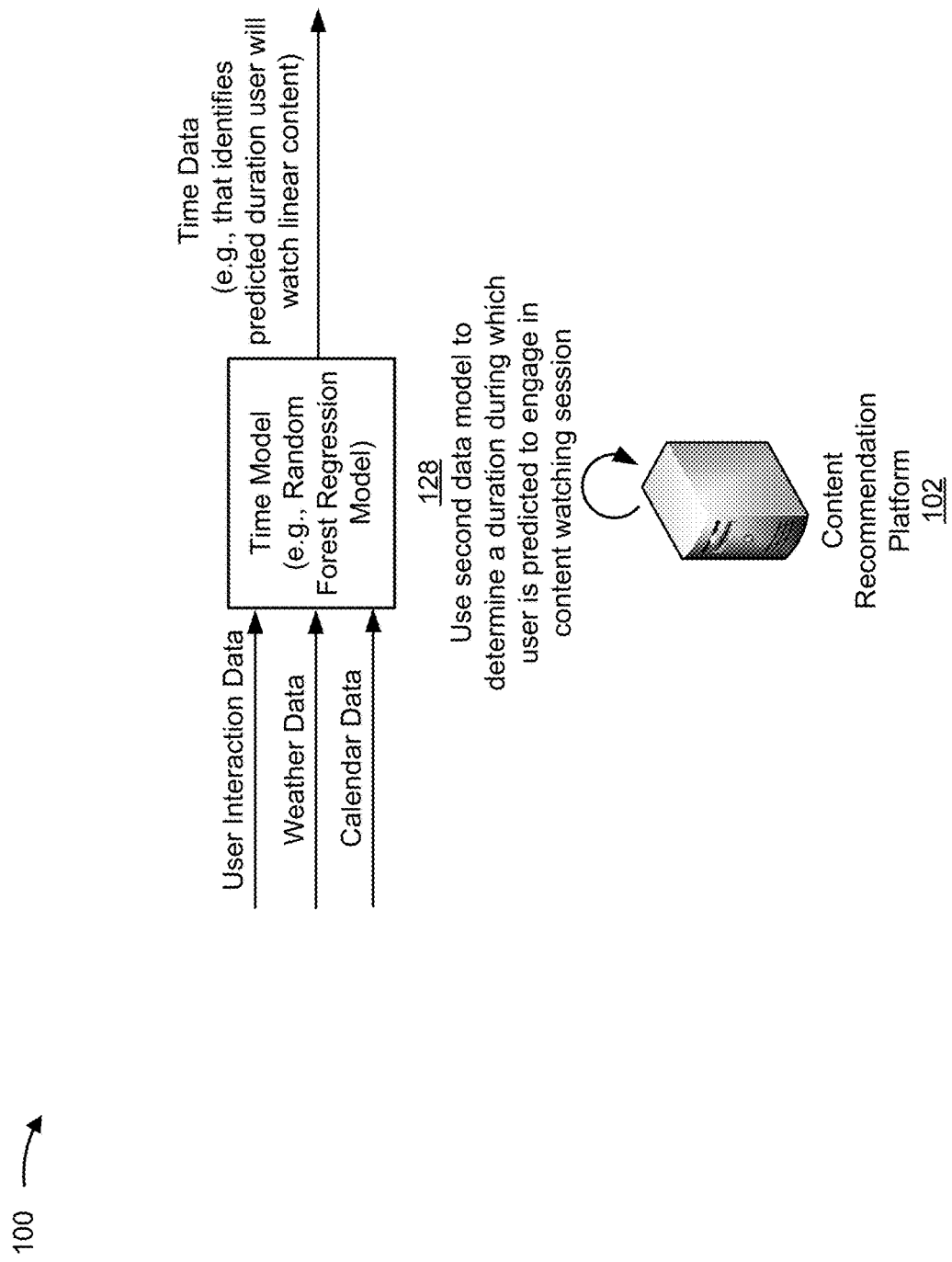
Figure 11:
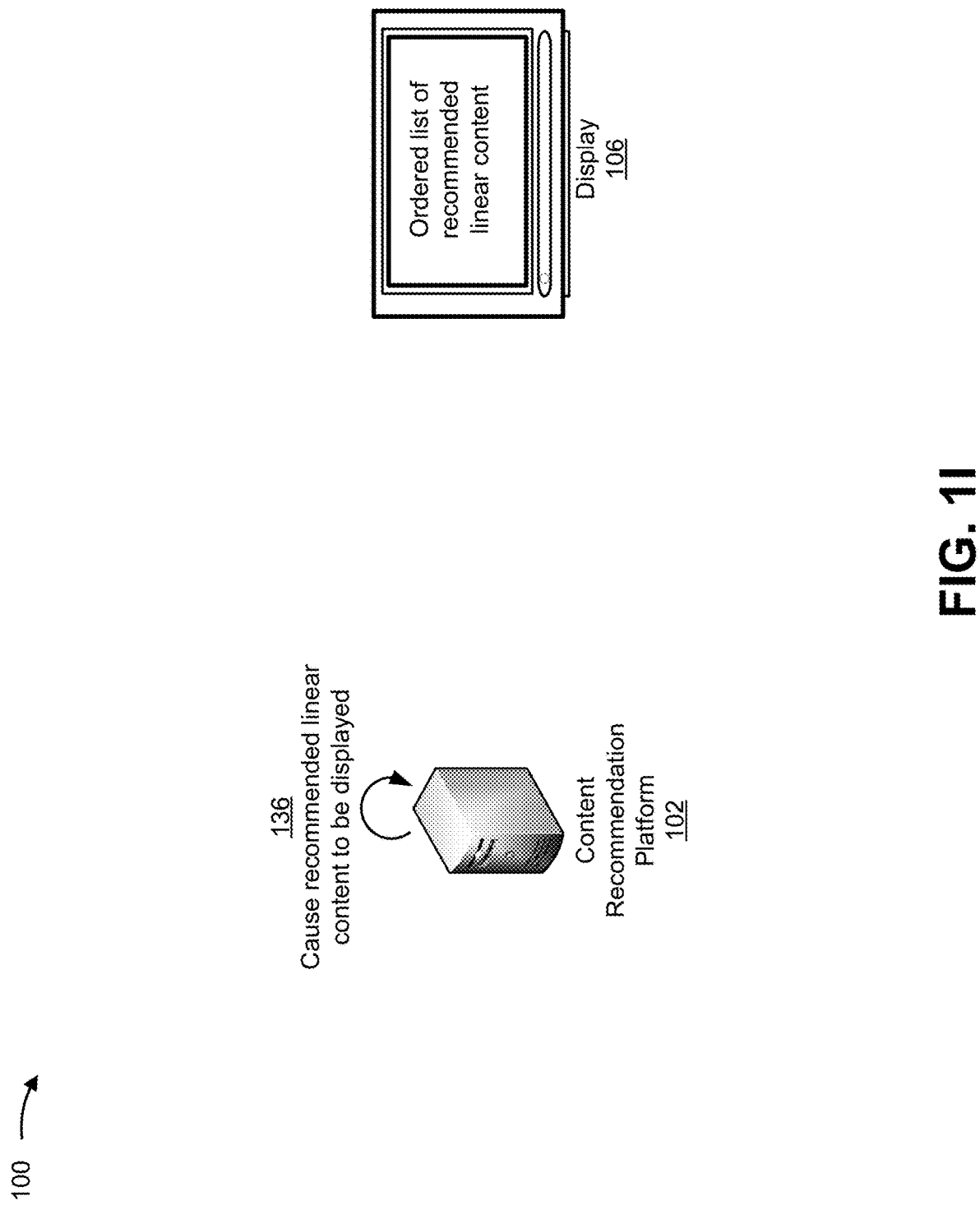

As shown in FIG. 1F, and by reference number 128, content recommendation platform 102 may use the second data model to determine a duration during which the user is predicted to engage in a content watching session. For example, to be able to predict not just a likelihood of the user being receptive to viewing particular linear content, but to predict linear content that the user will select and watch during a content watching session, content recommendation platform 102 may predict how long the user will spend watching linear content during the content watching session. In this case, content recommendation platform 102 may provide, as input to the second data model, the content data for the user (e.g., user interaction data, and/or the like), the weather data, and/or the calendar data, which may cause the second data model to output time data that identifies a predicted duration during which the user will engage in the content watching session (i.e., the predicted duration during which the user will watch linear content).

To provide a specific example, if the user habitually watches TV from 5:00 p.m. to 6:00 p.m. and a current time is 5:01 p.m., the second data model may output time data indicating that the user is predicted to watch linear content for the next one hour. As another example, if the user habitually watches a specific sports team, and that sports team is televised within a threshold time of a current time, the second data model may output time data indicating that the user is predicted to watch linear content for a duration that corresponds to an end of the sports game. As another example, if the user watches TV on Saturday afternoons for a variable amount of time, the second data model may output time data that is based on a set of factors, such as the weather, whether the present date is a holiday, whether the user has other plans as identified in an electronic calendar, and/or the like.

In some implementations, content recommendation platform 102 may use the second data model to output measures of likelihoods of the user watching linear content for various durations. In this case, content recommendation platform 102 may select time data that identifies a duration during which the user is predicted to engage in the content watching session based on particular time data that corresponds to a highest available likelihood value.

In this way, content recommendation platform 102 uses the second data model to determine the duration during which the user is predicted to engage in the content watching session.

As shown in FIG. 1G, and by reference number 130, content recommendation platform 102 may determine, for each linear content, a measure of utility that the linear content is predicted to have to the user during the content watching session. In some implementations, content recommendation platform 102 may provide, as input to the utility/negative utility function, the measures of likelihoods of the user being receptive to each respective linear content (shown as content probability scores) and the time data that identifies the duration during which the user is predicted to engage in the content watching session. This may cause the utility/negative utility function to output a set of measures of utility that each respective linear content is predicted to have to the user during the content watching session. The set of measures of utility may include positive utility values that represent an increase in utility that particular linear content is predicted to have to the user, negative utility values that reflect a decrease in utility that particular linear content is predicted to have to the user, and/or the like.

In some implementations, content recommendation platform 102 may use the utility/negative utility function to separately process each measure of likelihood of the user being receptive to particular linear content. For example, content recommendation platform 102 may provide, as input to the utility/negative utility function, a measure of a likelihood of the user being receptive to particular linear content and the time data that identifies the duration during which the user is predicted to engage in the content watching session. In this case, the utility/negative utility function may output a measure of utility that the particular linear content is predicted to have during the content watching session. Content recommendation platform 102 may repeat this process for each measure of likelihood value that corresponds to each respective linear content.

In some implementations, content recommendation platform 102 may use the utility/negative utility function to determine an initial measure of utility that is based on a measure of likelihood that the user will be receptive to the particular linear content and a duration of the particular linear content. In some implementations, content recommendation platform 102 may use a utility decay predictor (e.g., which may be an element of the utility/negative utility function) to reduce the initial measure of utility. The utility decay predictor may, for example, reduce the initial measure of utility based on one or more factors described below.

In some implementations, the utility decay predictor may reduce the initial measure of utility for particular linear content based on a difference between a present time and a time at which the particular linear content is scheduled to be shown. For example, if the user is predicted to watch linear content for a short time period, particular linear content that is broadcast at the beginning of the content watching session may be assigned higher utility (e.g., relative to other linear content broadcast near the end of the content watching session). As another example, if the user is predicted to watch particular linear content for a long time period, and if the particular linear content has a high likelihood of being receptive to the user but is not broadcast until the second half of the content watching session, then content recommendation platform 102 may use the utility decay predictor to assign a higher utility (e.g., despite that the particular linear content is not broadcast until the second half of the content watching session).

Additionally, or alternatively, if the user is predicted to watch linear content for one hour, the utility decay predictor may reduce the measure of utility for the particular linear content if the particular linear content has a duration of more than one hour (e.g., because the user may be less likely to watch the particular linear content if the user does not have time to watch that content from beginning to end).

In some implementations, content recommendation platform 102 may determine a set of measures of utility using an equation of the form:

$$\text{Measure of Utility} = P(\text{user}_i, \text{content}_j) * \text{length}_j * \left(\frac{1}{1 + \exp(t/\theta)}\right)$$

In the equation above, the term $P(\text{user}_i, \text{content}_j)$ represents a set of measures of likelihoods of the user being receptive to each respective linear content in the collection of linear content, where i is the user and j is particular linear content. Additionally, the term $\text{length}_j$ represents a duration of the particular linear content. Additionally, the term $$\left(\frac{1}{1 + \exp(t/\theta)}\right)$$

represents the utility decay predictor, where t is a quantity of minutes until content j begins (e.g., as measured from a present time $t_0$).

In this way, content recommendation platform 102 determines, for each linear content, the measure of utility that the linear content is predicted to have to the user during the content watching session.

As shown in FIG. 1H, and by reference number 132, content recommendation platform 102 may associate linear content identifiers with weights that correspond to the set of measures of utility. For example, content recommendation platform 102 may generate a graph data structure that associates linear content identifiers with weights that correspond to the set of measures of utility that measure the utility that each respective linear content is predicted to have to the user during the content watching session. The graph data structure may be a directed graph (e.g., a directed acyclic graph (DAG)), a weighted graph (e.g., a weighted DAG and/or another type of weighted graph), a labeled graph, and/or the like.

In some implementations, content recommendation platform 102 may generate a weighted DAG. For example, content recommendation platform 102 may generate a weighted DAG that includes a set of nodes and a set of edges. In this case, each node may represent a fixed time, such as a scheduled time during which a broadcast of particular linear content is to begin or end (e.g., nodes may map to every hour and/or half hour in a 24-hour EPG viewing schedule). Additionally, each edge may represent particular linear content and may be assigned a weight that corresponds to a measure of utility determined for the particular linear content. To generate the weighted DAG, content recommendation platform 102 may set a source node to a first time (e.g., a present time, a first hour in a 24-hour day, and/or the like), may set a sink node to a final time (e.g., a predicted time at which the user will stop watching linear content, a final hour in the 24-hour day, and/or the like), may set a group of intermediary nodes to times between the first time and the final time, may generate edges between each respective combination of nodes, and/or may assign the weights to each respective node.

In the example shown, content recommendation platform 102 may predict that the user will watch TV between 5:00 p.m. and 6:30 p.m. In this example, content recommendation platform 102 may generate a weighted DAG that includes a source node as a first time (5:00 p.m.) and a sink node as a final time (6:30 p.m.), and a group of intermediary nodes between the source node and the sink node (e.g., a first intermediary node corresponding to 5:30 p.m. and a second intermediary node corresponding to 6:00 p.m.). Additionally, content recommendation platform 102 may generate edges between each respective node, such as by generating a first edge that corresponds to content A, a second edge that corresponds to content B, a third edge that corresponds to content C, and a fourth edge that corresponds to content D). Furthermore, content recommendation platform 102 may assign the weights to each respective node, such as by assigning a weight of 0.6 to the first edge (e.g., which corresponds to a utility score of content A), by assigning a weight of 0.4 to the second edge (e.g., which corresponds to a utility score of content B), by assigning a weight of 0.2 to the third edge (e.g., which corresponds to a utility score of content C), and by assigning a weight of 0.1 to the fourth edge (e.g., which corresponds to a utility score of content D).

In some implementations, content recommendation platform 102 may generate a data structure other than a graph. For example, content recommendation platform 102 may generate an array, a list, a tree, a hash table, and/or the like.

As shown by reference number 134, content recommendation platform 102 may reference the graph data structure to determine the set of recommended linear content for the user. For example, content recommendation platform 102 may perform a shortest path technique to determine a shortest path from a source node of the graph data structure to a sink node of the graph data structure and may select, as the set of recommended linear content, linear content identified by the shortest path. The shortest path technique may include a Dijkstra's shortest path technique, a Bellman-Ford shortest path technique, an A* search shortest path technique, a Viterbi shortest path technique, and/or the like.

In the example shown, content recommendation platform 102 may use Dijkstra's shortest path technique to determine that a first path from the source node to the sink node (e.g., via content A) has a weight of 0.6 and that a second path from the source node to the sink node (e.g., via content B, C, and D, respectively) has a collective weight of 0.7. Consequently, content recommendation platform 102 may determine that the first path is the shortest path and may select linear content that is found in the first path as linear content to recommend to the user (e.g., content A).

In this way, content recommendation platform 102 determines the set of recommended linear content for the user.

As shown in FIG. 1I, and by reference number 136, content recommendation platform 102 may cause the set of recommended linear content to be displayed. For example, content recommendation platform 102 may cause the set of recommended linear content to be displayed by display 106 (e.g., via an interface of the EPG). In this case, content recommendation platform 102 may communicate with the one or more servers that support the EPG (e.g., using an API or another type of communication interface) to cause the set of recommended linear content to be displayed.

In some implementations, content recommendation platform 102 may cause an ordered list of recommended linear content to be displayed to the user. Additionally, or alternatively, content recommendation platform 102 may cause recommended linear content for a present time to be automatically selected and broadcast for the user, providing the user with a personalized channel experience by seamlessly tuning in to appropriate channels. Using the example shown in FIG. 1H, content recommendation platform 102 may cause content A to be displayed for the user, to be automatically selected and broadcast for the user, and/or the like.

In some implementations, content recommendation platform 102 may cause a customized trailer for recommended linear content to be displayed. For example, content recommendation platform 102 may cause a customized trailer for recommended linear content to be displayed based on content configuration data that identifies one or more content viewing preferences of the user. In some implementations, content recommendation platform 102 may select the customized trailer by referencing a data structure that is used to store different versions of trailers for the recommended linear content. For example, the data structure may associate each respective trailer (or identifiers for each respective trailer) with different types of content configuration data that correspond to particular content viewing preferences. In this case, content recommendation platform 102 may select the trailer based on the trailer (or an identifier of the trailer) being stored in association with particular content configuration data that matches the corresponding content configuration data that identifies the one or more content viewing preferences of the user.

Additionally, or alternatively, content recommendation platform 102 may select the customized trailer using another data model that has been trained using machine learning. For example, if specific content viewing preferences of the user do not map directly to specific trailer metadata values, content recommendation platform 102 may use the other data model to predict a trailer that has a highest likelihood of being receptive to the user. The other data model may be trained in a manner consistent with that described in connection with other data models described herein. To use the other data model, content recommendation platform 102 may provide, as input to the other data model, the recommended linear content and the content preferences data for the user, to cause the other data model to output one or more scores that indicate likelihoods of each respective trailer for the recommended linear content being receptive to the user. This may allow content recommendation platform 102 to select the customized trailer based on the one or more scores.

In some implementations, content recommendation platform 102 may record the recommended linear content. For example, content recommendation platform 102 may record the recommended linear content such that the user may watch the recommended linear content at a later time period. In some implementations, content recommendation platform 102 may be configured to automatically record the recommended linear content. In some implementations, content recommendation platform 102 may determine to record the recommended linear content based on a trigger condition being satisfied. For example, content recommendation platform 102 may determine to record the recommended linear content based on predicting that the user will be unavailable to watch the recommended linear content (e.g., as may be determined using one or more data models described herein) and/or based on another trigger condition.

Additionally, or alternatively, content recommendation platform 102 may cause other types of data to be displayed based on the recommended linear content. For example, content recommendation platform 102 may cause a push notification to be displayed, a graphical image promoting newly released content to be displayed, and/or the like.

In some implementations, content recommendation platform 102 may retrain the one or more data models based on new content viewership data and/or user feedback. For example, over time, the user may continue to interact with the EPG by viewing recommended linear content, by manually switching a channel of display 106 to display different linear content, by inputting feedback (e.g., feedback from a user satisfaction questionnaire, binary feedback allowing the user to like or dislike content, a rating system allowing the user to rate the content with a particular number of stars, and/or the like), and/or the like. This may cause new content viewership data and/or user feedback data associated with the user's interactions to be provided to content recommendation platform 102. In this case, content recommendation platform 102 may be configured to retrain the one or more data models based on the new content viewership data and/or the user feedback data. The one or more data models may be retrained, for example, once a day, when a threshold level of data model accuracy is not satisfied, when negative user feedback is received, and/or the like.

Additionally, or alternatively, content recommendation platform 102 may use device activity data to retrain the one or more data models. For example, a level of interest that the user has in particular linear content may be determined indirectly based on a level of activity found on the user's mobile device during the scheduled viewing time of the particular linear content (e.g., relative to an average amount of activity for that time of day). This is because the user is less likely to be using the user's phone if the user is engaged in the particular linear content, and more likely to be using the user's phone if the user is not engaged with the particular linear content. In this case, the mobile device of the user may collect and report device activity data to content recommendation platform 102. This may allow content recommendation platform 102 to use the device activity data to determine how receptive the user is to the particular linear content and to retrain the one or more data models based on the device activity data.

In some implementations, content recommendation platform 102 may recommend linear content to a group of users. For example, content recommendation platform 102 may receive content data associated with content that is available to a group of users that share the same account, that are part of the same family and/or household, that are watching linear content at the same time and via the same device, and/or the like. In some implementations, content recommendation platform 102 receive an indication of which users, of the group of users, are to watch linear content. For example, a first user may be logged into the EPG and may plan on watching a TV show with a second user who is not logged into the EPG. In this case, display 106 may allow the second user to provide an indication that the second user is planning on watching the TV show, such as by interacting with an interface of display 106 to sign in to an account, by selecting an active user button on an interface of display 106, by speaking an active user voice command, and/or the like. This may cause a message to be provided to content recommendation platform 102 that indicates which of the group of users are to watch linear content.

Additionally, or alternatively, content recommendation platform 102 may predict which users, of the group of users, are to watch linear content. For example, content recommendation platform 102 may use a third data model, trained using machine learning, that is capable of processing one or more types of data described herein to predict which users are to watch linear content. The prediction may be based on a trend indicating that multiple users in the same family watch the same TV show together, based on location data of mobile devices of users in the group, based on processing sound data in a vicinity of display 106 (e.g., to identify a voice of a particular user), and/or the like. Some data used in connection with the third data model may require consent of the user (e.g., as may be obtained via an opt-in procedure or another type of procedure). In this way, content recommendation platform 102 recommends linear content to a group of two or more users (e.g., regardless of whether each user is formally signed in to the EPG).

In this way, content recommendation platform 102 uses machine learning to provide the user with recommended linear content. This conserves resources (e.g., processing resources, network resources, power resources, and/or the like) that a group of devices (e.g., display 106, a remote control linked to display 106, and/or the one or more servers associated with the EPG) that might waste were the user to have to manually search through the EPG to identify and select linear content.

As indicated above, FIGS. 1A-1I are provided as one or more examples. Other examples can differ from what is described with regard to FIGS. 1A-1I.

Figure 2:
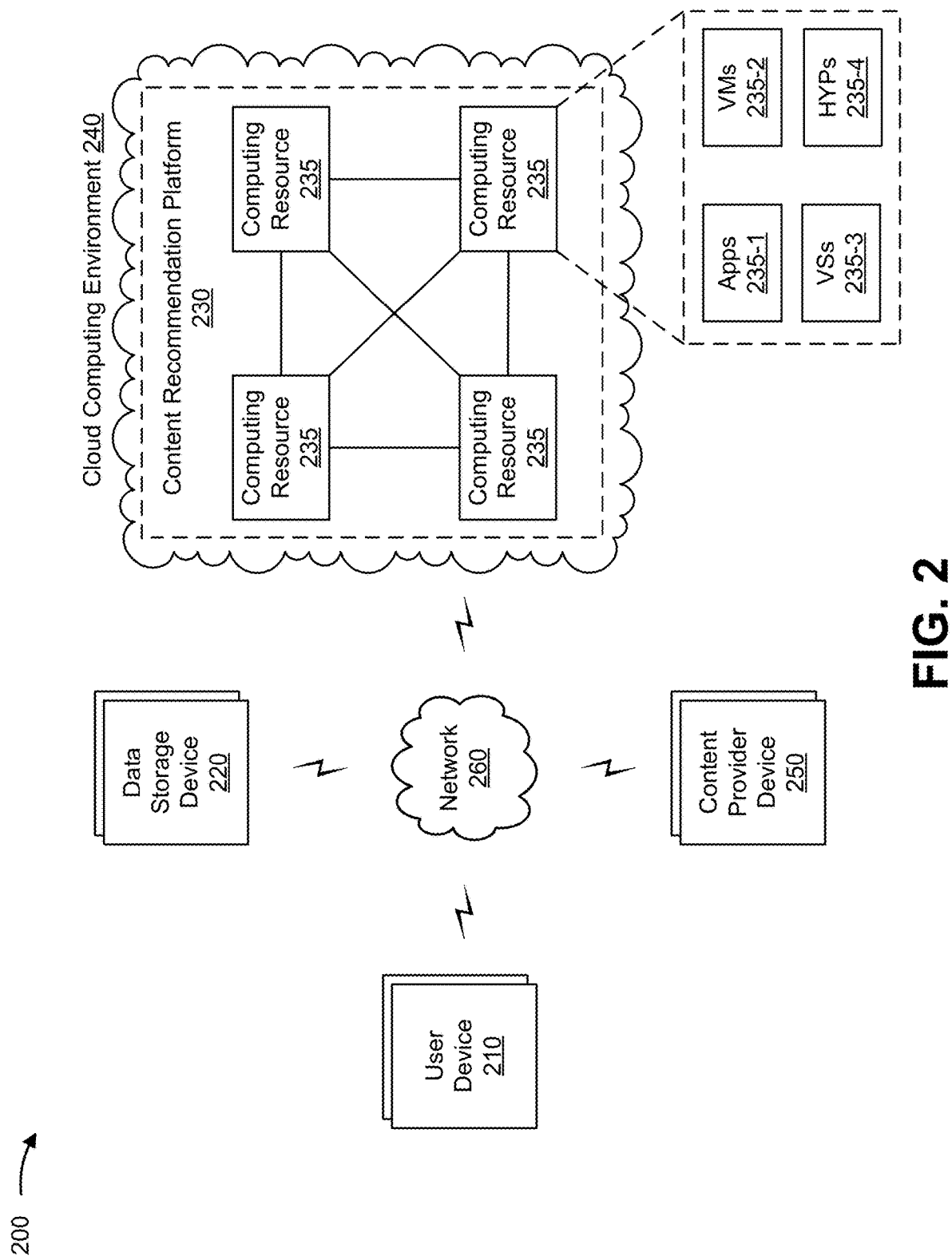
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a data storage device 220, a content recommendation platform 230 hosted within a cloud computing environment 240, a content provider device 250, and/or a network 260. Devices of environment 200 may interconnect via wired connections, wireless connections, or a combination of wired and wireless connections.

User device 210 includes one or more devices capable of receiving, storing, processing, and/or providing information associated with content (e.g., linear television (TV) content, and/or the like). For example, user device 210 may include a TV, a set top box (STB), a remote control, a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, an Internet of Things (IoT) device (e.g., a smart TV, appliance, a smart light, a connected vehicle, and/or the like), and/or a similar device.

In some implementations, user device 210 may receive recommended content from content provider device 250 (and/or from content recommendation platform 230). In some implementations, user device 210 may display the recommended content. For example, an interface of a TV may display the recommended content, an interface of a mobile device may display the recommended content, and/or the like. In some implementations, the interface that displays the recommended content may be part of an electronic program guide (EPG).

Data storage device 220 includes one or more devices capable of receiving, storing, processing, and/or providing information, such as information associated with content (e.g., linear content, and/or the like). For example, data storage device 220 may include a server device or a group of server devices. In some implementations, a group of data storage devices 220 may store content data for a group of users, as further described in connection with FIGS. 1A-1I. In some implementations, the group of data storage devices 220 may receive a request for content data from content recommendation platform 230, which may cause the group of data storage devices 220 to provide the content data, weather data, and/or calendar data to content recommendation platform 230. In some implementations, data storage device 220 may use a communication interface, such as an application programming interface (API) and/or another type of interface, to provide the content data, the weather data, and/or the calendar data to content recommendation platform 230. In some implementations, content recommendation platform 230 may integrate with one or more third-party APIs, such as a first API that allows content recommendation platform 230 to obtain the weather data from a first data storage device 220, a second API that allows content recommendation platform 230 to obtain the calendar data from a second data storage device 220, and/or the like.

Content recommendation platform 230 includes one or more devices capable of receiving, storing, generating, determining, and/or providing information associated with content (e.g., linear content, and/or the like). For example, content recommendation platform 230 may include a server device (e.g., a host server, a web server, an application server, etc.), a data center device, or a similar device.

In some implementations, content recommendation platform 230 may receive content data for a collection of linear content that is available to a group of users. In some implementations, content recommendation platform 230 may host and/or support one or more data models that are described elsewhere herein. In some implementations, content recommendation platform 230 may be configured with a utility/negative utility function that may be used to determine a set of measures of utility that each respective linear content, of the collection of linear content, is predicted to have to a user during a content watching session.

In some implementations, content recommendation platform 230 may receive an indication to recommend linear content for a user. In some implementations, content recommendation platform 230 may obtain content data for a collection of linear content that is available to the user. In some implementations, content recommendation platform 230 may generate and provide a set of recommended linear content to one or more user devices 210 that are associated with the user.

In some implementations, as shown, content recommendation platform 230 may be hosted in cloud computing environment 240. Notably, while implementations described herein describe content recommendation platform 230 as being hosted in cloud computing environment 240, in some implementations, content recommendation platform 230 might not be cloud-based (i.e., may be implemented outside of a cloud computing environment) or may be partially cloud-based.

Cloud computing environment 240 includes an environment that hosts content recommendation platform 230. Cloud computing environment 240 may provide computation, software, data access, storage, etc. services that do not require end-user knowledge of a physical location and configuration of system(s) and/or device(s) that hosts content recommendation platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host content recommendation platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210, data storage device 220, and/or content provider device 250. Application 235-1 may eliminate a need to install and execute the software applications on these devices. For example, application 235-1 may include software associated with content recommendation platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, data storage device 220, and/or content provider device 250), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Content provider device 250 includes one or more devices capable of receiving, storing, generating, processing, and/or providing information associated with content (e.g., linear content, and/or the like). For example, content provider device 250 may include a server device or a group of server devices. In some implementations, content provider device 250 may support the EPG application that runs on a TV. In some implementations, content provider device 250 may receive, from content recommendation platform 230, data that identifies the set of recommended content that is to be displayed as part of the EPG. In some implementations, content provider device 250 may support a chatbot service that allows recommended content to be displayed via an interface of the TV and/or another type of display device, that allows the user to input feedback, that allows the user to make voice-activated and/or touch-activated channel requests, and/or the like.

Network 260 includes one or more wired and/or wireless networks. For example, network 260 may include a cellular network (e.g., a 5G network, a 4G network, such as an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
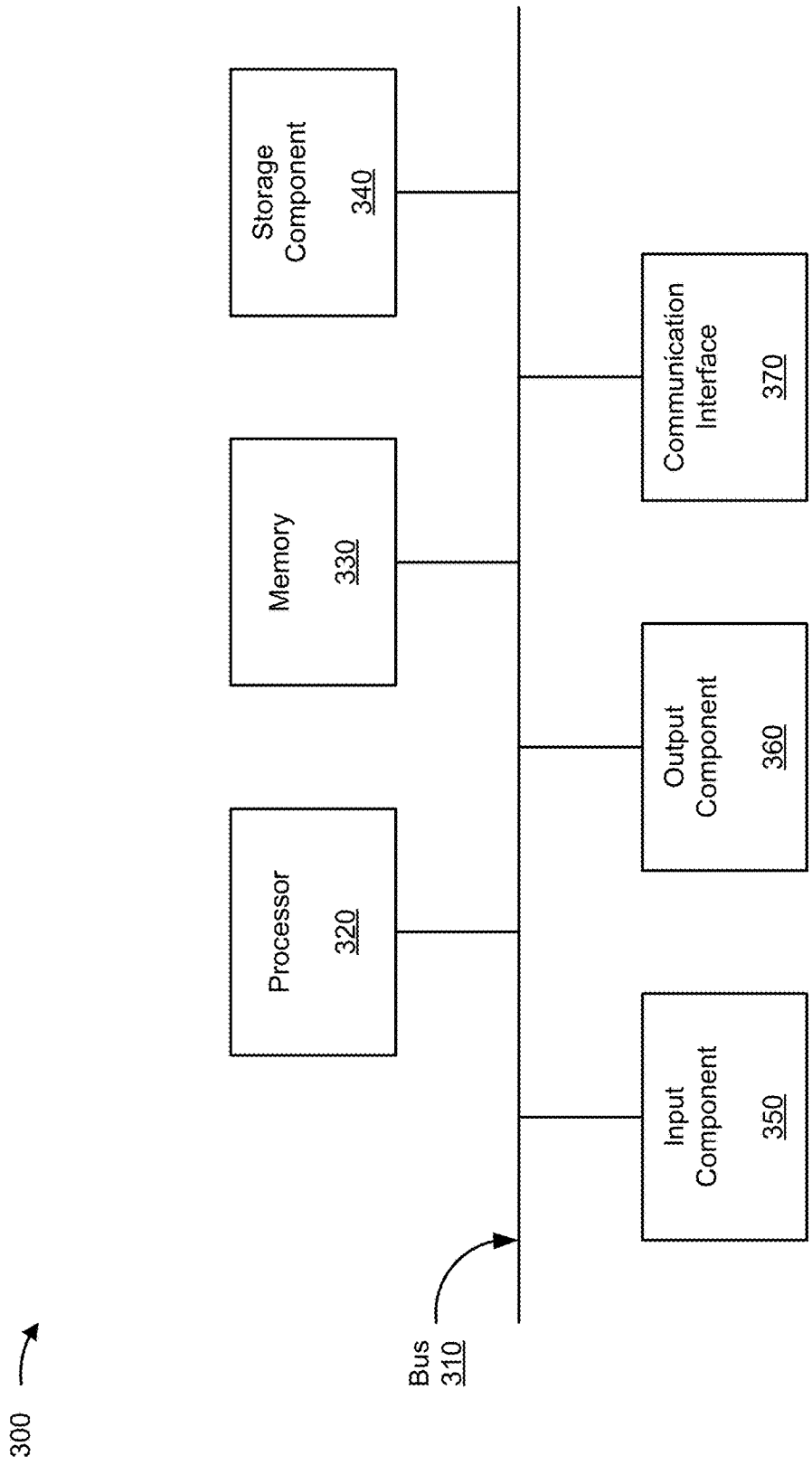
FIG. 3 is a diagram of example components of one or more devices of FIG. 2.

FIG. 3 is a diagram of example components of a device 300. Device 300 may correspond to user device 210, data storage device 220, content recommendation platform 230, and/or content provider device 250. In some implementations, user device 210, data storage device 220, content recommendation platform 230, and/or content provider device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
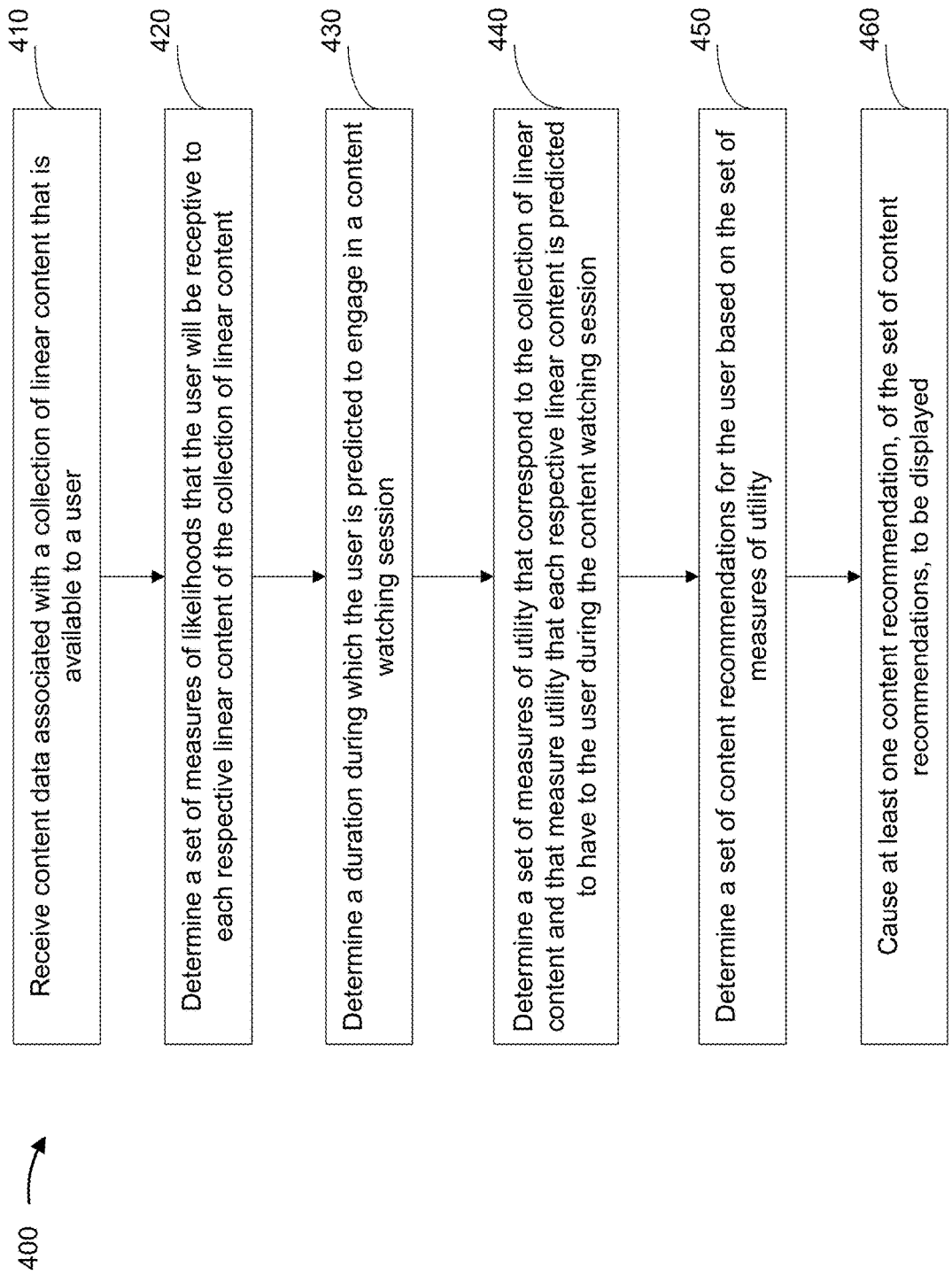
FIG. 4 is a flow chart of an example process for recommending linear content to a user.

FIG. 4 is a flow chart of an example process 400 for recommending linear television (TV) content to a user. In some implementations, one or more process blocks of FIG. 4 may be performed by a content recommendation platform (e.g., content recommendation platform 230). In some implementations, one or more process blocks of FIG. 4 may be performed by another device or a group of devices separate from or including the content recommendation platform, such as a user device (e.g., user device 210), a data storage device (e.g., data storage device 220), a content provider device (e.g., content provider device 250), and/or the like.

As shown in FIG. 4, process 400 may include receiving content data associated with a collection of linear content that is available to a user (block 410). For example, the content recommendation platform (e.g., using computing resource 235, processor 320, memory 330, storage component 340, input component 350, communication interface 370, and/or the like) may receive content data associated with a collection of linear content that is available to a user. In some implementations, the content recommendation platform may receive content that is available to a user (e.g., linear content, over-the-top (OTT) media services, and/or the like).

In some implementations, the content data may include content metadata for the collection of linear content and content viewership data that identifies a set of interactions that the user has had with the collection of linear content over time. In some implementations, the content metadata may include at least one of: metadata that identifies air times of particular linear content, metadata that describes the particular linear content, metadata that identifies a genre of the particular linear content, metadata that identifies a cast of the particular linear content, or metadata that identifies one or more awards associated with the particular linear content. In some implementations, the content viewership data may include at least one of: a first set of content logs that identify particular content selected by the user over time, or a second set of content logs that identify specific content selected by one or more other users over time.

In some implementations, the content data may further include content configuration data that identifies one or more content viewing preferences of the user. In some implementations, the content data may further include content popularity data that identifies a measure of a level of popularity of particular linear content among a group of users.

As further shown in FIG. 4, process 400 may include determining a set of measures of likelihoods that the user will be receptive to each respective linear content of the collection of linear content (block 420). For example, the content recommendation platform (e.g., using computing resource 235, processor 320, memory 330, storage component 340, and/or the like) may determine a set of measures of likelihoods that the user will be receptive to each respective linear content of the collection of linear content, as described above. In some implementations, the content recommendation platform may determine the set of measures of likelihoods by processing the content data using a first data model that has been trained using machine learning. In some implementations, the first data model may be a neural network.

In some implementations, when determining the set of measures of likelihoods, the content recommendation platform may provide the content data, that includes the content popularity data, as input to the first data model to cause the first data model to output, for the particular linear content, a measure of likelihood that the user will be receptive to the particular linear content. In some implementations, the measure of likelihood may be based on the measure of the level of popularity of the particular linear content and based on the content configuration data that identifies the one or more content viewing preferences of the user.

In some implementations, the content recommendation platform may receive weather data that identifies a weather forecast for an area associated with the user and calendar data that identifies one or more events associated with the user.

As further shown in FIG. 4, process 400 may include determining a duration during which the user is predicted to engage in a content watching session (block 430). For example, the content recommendation platform (e.g., using computing resource 235, processor 320, memory 330, storage component 340, and/or the like) may determine a duration during which the user is predicted to engage in a content watching session, as described above. In some implementations, the content recommendation platform may determine the duration during which the user is predicted to engage in a content watching session by using a second data model that has been trained using machine learning to process the content viewership data. In some implementations, the second data model may be a regression-based data model.

In some implementations, the content recommendation platform may provide, as input data to the second data model, two or more of: the content viewership data, the weather, or the calendar data. Additionally, the input data may cause the second data model to output time data that identifies the duration during which the user is predicted to engage in the content watching session.

As further shown in FIG. 4, process 400 may include determining a set of measures of utility that correspond to the collection of linear content and that measure utility that each respective linear content is predicted to have to the user during the content watching session (block 440). For example, the content recommendation platform (e.g., using computing resource 235, processor 320, memory 330, storage component 340, and/or the like) may determine a set of measures of utility that correspond to the collection of linear content and that measure utility that each respective linear content is predicted to have to the user during the content watching session, as described above. In some implementations, the content recommendation platform may determine the set of measures of utility based on the set of measures of likelihoods and time data that identifies the duration during which the user is predicted to engage in the content watching session.

In some implementations, when determining the set of measures of utility, the content recommendation platform may determine a measure of utility that particular linear content is predicted to have to the user during the content watching session based on a measure of likelihood that the user will be receptive to the particular linear content, a duration of the particular linear content, and an output of a utility decay predictor that reduces the measure of utility based on a difference between a present time and a time at which the particular linear content is scheduled to be shown.

Additionally, or alternatively, when determining the set of measures of utility, the content recommendation platform may determine a measure of utility that particular linear content is predicted to have to the user during the content watching session based on a measure of likelihood that the user will be receptive to the particular linear content, a duration of the particular linear content, and an output of a utility decay predictor that reduces the measure of utility based on at least one of: a first indication of whether the user has time to watch the particular linear content, or a second indication of whether the user has time to watch other linear content in addition to the particular linear content during the content watching session. The first indication may, for example, be based on a determination of whether a duration during which the user is predicted to engage in the content watching session is less than a total duration of the particular linear content. The second indication may, for example, be based on a determination of whether watching the particular linear content would prevent the user from watching other linear content during the content watching session.

As further shown in FIG. 4, process 400 may include determining a set of content recommendations for the user based on the set of measures of utility (block 450). For example, the content recommendation platform (e.g., using computing resource 235, processor 320, memory 330, storage component 340, and/or the like) may determine a set of content recommendations for the user based on the set of measures of utility, as described above.

In some implementations, the content recommendation platform may generate a data structure that associates content identifiers for the collection of linear content with the set of measures of utility. In some implementations, the content recommendation platform may determine a path (e.g., a shortest path) from a first point of the data structure to a second point of the data structure based on the set of measures of utility. The path may correspond to a highest available measure of utility or a lowest available measure of negative utility. Additionally, the content recommendation platform may determine the set of content recommendations based on the set of content recommendations identified by the path.

As further shown in FIG. 4, process 400 may include causing at least one content recommendation, of the set of content recommendations, to be displayed (block 460). For example, the content recommendation platform (e.g., using computing resource 235, processor 320, memory 330, storage component 340, output component 360, communication interface 370, and/or the like) may cause at least one content recommendation, of the set of content recommendations, to be displayed, as described above.

In some implementations, when causing at least one content recommendation to be displayed, the content recommendation platform may cause the set of content recommendations to be automatically displayed via an electronic program guide (EPG). In some implementations, when causing at least one content recommendation to be displayed, the content recommendation platform may cause a first content recommendation, of the set of content recommendations, to be automatically displayed as part of the EPG at a first show time, and may cause one or more other content recommendations, of the set of content recommendations, to be automatically displayed as part of the EPG at one or more other show times.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, content data associated with a collection of linear television (TV) content that is available to a user,
      wherein the content data includes two or more of:
         content metadata for the collection of linear content,
         content configuration data that identifies one or more content viewing preferences of the user, and
         content viewership data that identifies a set of interactions that the user has had with the collection of linear content over time;
   determining, by the device and by processing the content data using a first data model that has been trained using machine learning, a set of measures of likelihoods that the user will be receptive to each respective linear content of the collection of linear content;
   determining, by the device and by using a second data model that has been trained using machine learning to process the content viewership data, a duration during which the user is predicted to engage in a content watching session;
   determining, by the device, a set of measures of utility that correspond to the collection of linear content and that measure utility that each respective linear content is predicted to have to the user during the content watching session,
      wherein the set of measures of utility are determined based on the set of measures of likelihoods and time data that identifies the duration during which the user is predicted to engage in the content watching session;
   determining, by the device, a set of content recommendations for the user based on the set of measures of utility; and
   causing, by the device, at least one content recommendation, of the set of content recommendations, to be displayed.

2. The method of claim 1, wherein the content data further includes content popularity data that identifies a measure of a level of popularity of particular linear content between a group of users; and
   wherein determining the set of measures of likelihoods comprises:
      providing the content data, that includes the content popularity data, as input to the first data model to cause the first data model to output, for the particular linear content, a measure of likelihood that the user will be receptive to the particular linear content,
         wherein the measure of likelihood is based on the measure of the level of popularity of the particular linear content and based on the content configuration data that identifies the one or more content viewing preferences of the user.

3. The method of claim 1, wherein causing at least one content recommendation to be displayed comprises:
   causing a customized trailer for particular linear content, that is part of a content recommendation, to be displayed,
      wherein the customized trailer is based on the content configuration data that identifies the one or more content viewing preferences of the user.

4. The method of claim 1, wherein determining the set of measures of utility comprises:
   determining a measure of utility that particular linear content is predicted to have to the user during the content watching session based on a measure of likelihood that the user will be receptive to the particular linear content, a duration of the particular linear content, and an output of a utility decay predictor that reduces the measure of utility based on a difference between a present time and a time at which the particular linear content is scheduled to be shown.

5. The method of claim 1, wherein determining the set of measures of utility comprises:
   determining a measure of utility that particular linear content is predicted to have to the user during the content watching session based on a measure of likelihood that the user will be receptive to the particular linear content, a duration of the particular linear content, and an output of a utility decay predictor that reduces the measure of utility based on at least one of:
      a first indication of whether the user has time to watch the particular linear content, or
      a second indication of whether the user has time to watch other linear content in addition to the particular linear content during the content watching session.

6. The method of claim 1, further comprising:
   generating a data structure that associates content identifiers for the collection of linear content with the set of measures of utility; and
   determining a shortest path from a first point of the data structure to a second point of the data structure based on the set of measures of utility,
      wherein the shortest path corresponds to a highest available measure of utility or a lowest available measure of negative utility; and
   wherein determining the set of content recommendations comprises:
      determining the set of content recommendations based on the set of content recommendations identified by the shortest path.

7. The method of claim 1, wherein causing at least one content recommendation to be di splayed comprises:
   causing the set of content recommendations to be automatically displayed via an electronic program guide (EPG).

8. A device, comprising:
one or more memories; and
one or more processors, communicatively coupled to the one or more memories, to:
receive content data associated with a collection of content that is available to one or more users,
wherein the content data includes:
content metadata for the collection of content, and
content viewership data that identifies a set of interactions that the one or more users have had with the collection of content over time;
determine, by processing the content data using a data model that has been trained using machine learning, a set of measures of likelihoods that at least one user, of the one or more users, will be receptive to each respective content of the collection of content;
determine, by processing the content viewership data, a duration during which the at least one user is predicted to engage in a content watching session;
determine a set of measures of utility that correspond to the collection of content and that measure utility that each respective content, of the collection of content, is predicted to have to the at least one user during the content watching session,
wherein the set of measures of utility are determined based on the set of measures of likelihoods and time data that identifies the duration during which the at least one user is predicted to engage in the content watching session;
generate a data structure that associates content identifiers for the collection of content with the set of measures of utility;
determine a path from a first point of the data structure to a second point of the data structure based on the set of measures of utility,
wherein the path is associated with a highest available measure of utility or a lowest available measure of negative utility;
determine a set of content recommendations based on the path; and
cause at least one content recommendation, of the set of content recommendations, to be displayed.

9. The device of claim 8, wherein the content is linear content.

10. The device of claim 8, wherein the one or more processors, when determining the duration during which the at least one user is predicted to engage in the content watching session, are to:
provide, as input data to a second data model that has been trained using machine learning, two or more of:
the content viewership data,
weather data that identifies a weather forecast for an area associated with the one or more users, or
calendar data that identifies one or more events associated with the at least one user,
wherein the input data causes the second data model to output the time data that identifies the duration during which the at least one user is predicted to engage in the content watching session.

11. The device of claim 8, wherein the one or more processors, when determining the set of measures of utility, are to:
determine a measure of utility that particular content is predicted to have to the at least one user during the content watching session based on a measure of likelihood that the at least one user will be receptive to the particular content, a duration of the particular content, and an output of a utility decay predictor that reduces the measure of utility based on a difference between a present time and a time at which the particular content is scheduled to be show.

12. The device of claim 8, wherein the one or more processors, when determining the set of measures of utility, are to:
determine a measure of utility that particular content is predicted to have to the at least one user during the content watching session based on a measure of likelihood that the at least one user will be receptive to the particular content, a duration of the particular content, and an output of a utility decay predictor that reduces the measure of utility based on at least one of:
a first indication of whether the at least one user has time to watch the particular content, or
a second indication of whether the at least one user has time to watch other content in addition to the particular content during the content watching session.

13. The device of claim 8, wherein the one or more processors, when causing at least one content recommendation to be displayed, are to:
cause a customized trailer for particular linear content, that is part of a content recommendation, to be displayed,
wherein the customized trailer is based on content configuration data that identifies one or more content viewing preferences of the user.

14. The device of claim 8, wherein the one or more processors, when causing at least one content recommendation to be displayed, are to:
cause a first content recommendation, of the set of content recommendations, to be automatically displayed as part of an electronic program guide (EPG) at a first show time, and
cause one or more other content recommendations, of the set of content recommendations, to be automatically displayed as part of the EPG at one or more other show times.

15. A non-transitory computer-readable medium storing instructions, the instructions comprising:
one or more instructions that, when executed by one or more processors, cause the one or more processors to:
receive content data associated with a collection of linear television (TV) content that is available to a user,
wherein the content data includes:
content metadata for the collection of linear content, and
content viewership data that identifies a set of interactions that a group of users, that includes the user, have had with the collection of linear content over time;
determine, by processing the content data using a first data model that has been trained using machine learning, a set of measures of likelihoods that the user will be receptive to each respective linear content of the collection of linear content;
receive weather data that identifies a weather forecast for an area associated with the user and calendar data that identifies one or more events associated with the user;
determine a duration during which the user is predicted to engage in a content watching session by using a second data model, that has been trained using machine learning, to process at least one of:

the content viewership data,
the weather data, or
the calendar data;
determine a set of measures of utility that correspond to the collection of linear content and that measure utility that each respective linear content, of the collection of linear content, is predicted to have to the user during the content watching session,
wherein the set of measures of utility are determined based on the set of measures of likelihoods and time data that identifies the duration during which the user is predicted to engage in the content watching session;
determine a set of content recommendations for the user based on the set of measures of utility; and
cause at least one content recommendation, of the set of content recommendations, to be displayed.

16. The non-transitory computer-readable medium of claim 15, wherein the content data further includes content popularity data that identifies a measure of a level of popularity of particular linear content as between the group of users; and
wherein the one or more instructions, that cause the one or more processors to determine the set of measures of likelihoods, cause the one or more processors to:
provide the content data, that includes the content popularity data, as input to the first data model to cause the first data model to output, for the particular linear content, a measure of likelihood that the user will be receptive to the particular linear content,
wherein the measure of likelihood is based on the measure of the level of popularity of the particular linear content and based on particular content configuration data that identifies that identifies one or more content viewing preferences of the user.

17. The non-transitory computer-readable medium of claim 15, wherein the one or more instructions, that cause the one or more processors to determine the set of measures of utility, cause the one or more processors to:
determine a measure of utility that particular linear content is predicted to have to the user during the content watching session based on a measure of likelihood that the user will be receptive to the particular linear content, a duration of the particular linear content, and an output of a utility decay predictor that reduces the measure of utility based on at least one of:
a difference between a present time and a time at which the particular linear content is scheduled to be shown,
a first indication of whether the user has time to watch the particular linear content, or
a second indication of whether the user has time to watch other linear content in addition to the particular linear content during the content watching session.

18. The non-transitory computer-readable medium of claim 15, wherein the first data model is a neural network and the second data model is a regression-based model.

19. The non-transitory computer-readable medium of claim 15, wherein the content metadata includes at least one of:
metadata that identifies air times of particular linear content,
metadata that describes the particular linear content,
metadata that identifies a genre of the particular linear content,
metadata that identifies a cast of the particular linear content, or
metadata that identifies one or more awards associated with the particular linear content.

20. The non-transitory computer-readable medium of claim 15, wherein the one or more instructions, when executed by the one or more processors, further cause the one or more processors to:
generate a data structure that associates content identifiers for the collection of linear content with the set of measures of utility; and
determine a path from a first point of the data structure to a second point of the data structure based on the set of measures of utility,
wherein the path corresponds to a highest available measure of utility or a lowest available measure of negative utility; and
wherein the one or more instructions, that cause the one or more processors to determine the set of content recommendations, cause the one or more processors to:
determine the set of content recommendations based on the set of content recommendations identified in the path.

* * * * *